United States Patent [19]
Igarashi

[11] Patent Number: 5,400,316
[45] Date of Patent: Mar. 21, 1995

[54] HIGH DENSITY SMALL-DIAMETER MAGNETIC OPTICAL DISK

[75] Inventor: Shuichi Igarashi, Miyagi, Japan

[73] Assignee: Sony Corporation, Tokyo, Japan

[21] Appl. No.: 745,335

[22] Filed: Aug. 15, 1991

[30] Foreign Application Priority Data

Aug. 24, 1990 [JP] Japan .................................. 2-222831

[51] Int. Cl.⁶ .......................... G11B 7/24; G11B 18/04
[52] U.S. Cl. ................................ 369/275.1; 369/275.2; 369/13
[58] Field of Search .................... 369/13, 275.1–275.4, 369/284, 286; 360/59, 114

[56] References Cited

U.S. PATENT DOCUMENTS

| | | | |
|---|---|---|---|
| 4,801,499 | 1/1989 | Aoyama et al. | 369/13 |
| 4,876,133 | 10/1989 | Sugiyama et al. | 428/64 |
| 4,910,622 | 3/1990 | Saito et al. | 369/13 |
| 4,956,243 | 9/1990 | Miyake et al. | 369/13 |

FOREIGN PATENT DOCUMENTS 0355589  2/1990  European Pat. Off. .
01-52267 2/1989  Japan .

OTHER PUBLICATIONS

"System Design of Optical Micro-Disk Subsystem", SPIE vol. 899 Optical Storage Technology and Applications (1988) pp. 16–23.

"Extending the Performance of the Rewritable Magneto-Optical Disc", 1990 IEEE Jun. 6–8, 1990 Int'l Conference on Consumer Electronics, pp. 364–365.

"Effect of birefringence in polycarbonate substrates on dynamic performance of magnetooptical disks", SPIE vol. 1078 Optical Data Storage Topical Meeting (1989) pp. 201–203.

"Sharp Originates Four-Layer Film Rewritable Magneto-Optical Disk", IEEE Journal of Electronic Engineering, 24 (1987) Aug., No. 248, pp. 88–91.

"System Records Digitally on Magneto-Optical Mini--Disks, IEEE Journal of Electronic Engineering", 28 (1991) Jul., No. 295, pp. 104–106.

Primary Examiner—Hoa T. Nguyen
Attorney, Agent, or Firm—Hill, Steadman & Simpson

[57] ABSTRACT

A magnetic optical disc comprising a magnetic optical recording layer on a transparent substrate. The disc measures less than 80 millimeters in outer diameter and is capable of recording at least 130 megabytes of compressed digital signals. The extreme storage density of the disk is achieved by the suppression of double refraction characteristics near the center area of the disk, whereby the minimum diameter of the recording area can be made smaller. This allows a small-diameter magnetic optical disc to provide a recording area of sufficient storage capacity. In combination with a novel magnetic optical recording system, the disc may illustrative accommodate at least 60 minutes of the user's audio signals while measuring smaller than any other conventional discs of comparable storage capacity.

6 Claims, 6 Drawing Sheets

HIGH DENSITY SMALL-DIAMETER MAGNETIC OPTICAL DISK

BACKGROUND OF THE INVENTION

1. Field of the Invert%ion

The present invention relates to a novel magnetic optical disc having a diameter of less than 80 mm and capable of storing at least 130 megabytes of compressed digital signals. More particularly, the invention relates to a magnetic optical disc constituted by a transparent substrate having a double refraction retardation of within ±50 nm over an area having an inner diameter of at least as small as 32 mm, whereby a sufficiently large recording area is provided on a small-diameter magnetic optical disc.

2. Description of the Prior Art

The optical data recording method offers a number of advantages including easy-to-handle non-contact recording, and reproduction, high resistance to scratch or soil over the recording surface of the disc, and a huge recording capacity, tens or hundreds of times that of the currently used magnetic recording method. These favorable characteristics have prompted the optimal recording method to be implemented in the form of the compact disc and video disc for recording digitized audio and video signals. Furthermore, the optical recording method is increasingly finding its way into such applications as mass files of coded and image information.

The magnetic optical recording medium for use with the optical recording method is a transparent substrate illustratively made of polycarbonate resin and having an optical data recording layer thereon. The substrate is subject to various requirements when formed into a disc. One such requirement is a low level of double refraction (i.e., misalignment between the incident light for reading data from disc and the reflected light, primarily due to the internal distortion of the transparent substrate). Other major requirements include: high ability to be stamped, smooth substrate surface, low contamination, and low skew level of the formed surface.

In particular, the magnetic optical disc has one mandatory requirement to meet: because tiny revolutions of the magnetic optical disc on its plane of polarization under an irradiated laser beam are read as signals, the double refraction occurring within the transparent substrate must be minimized.

Against this background, advances and improvements have been made in the technology of injection molding by leading manufacturers in the field. The headway now makes it possible to form transparent substrates whose recording areas are substantially free of double refraction for such applications as compact discs and video discs.

Figure 6:
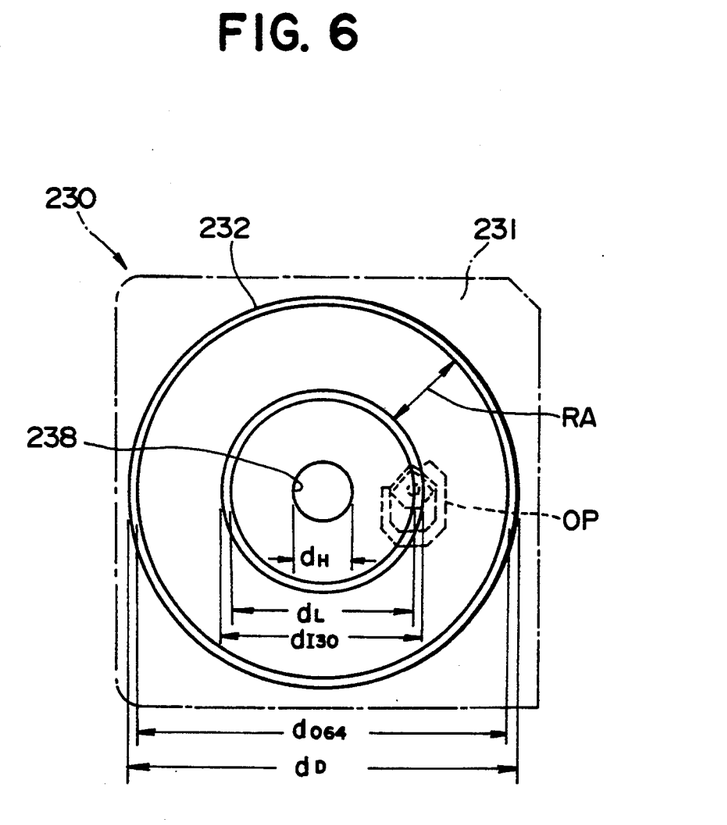
FIG. 6 is a schematic cross-sectional view depicting the typical prior art metal molds for forming disc substrates.
Figure 7:
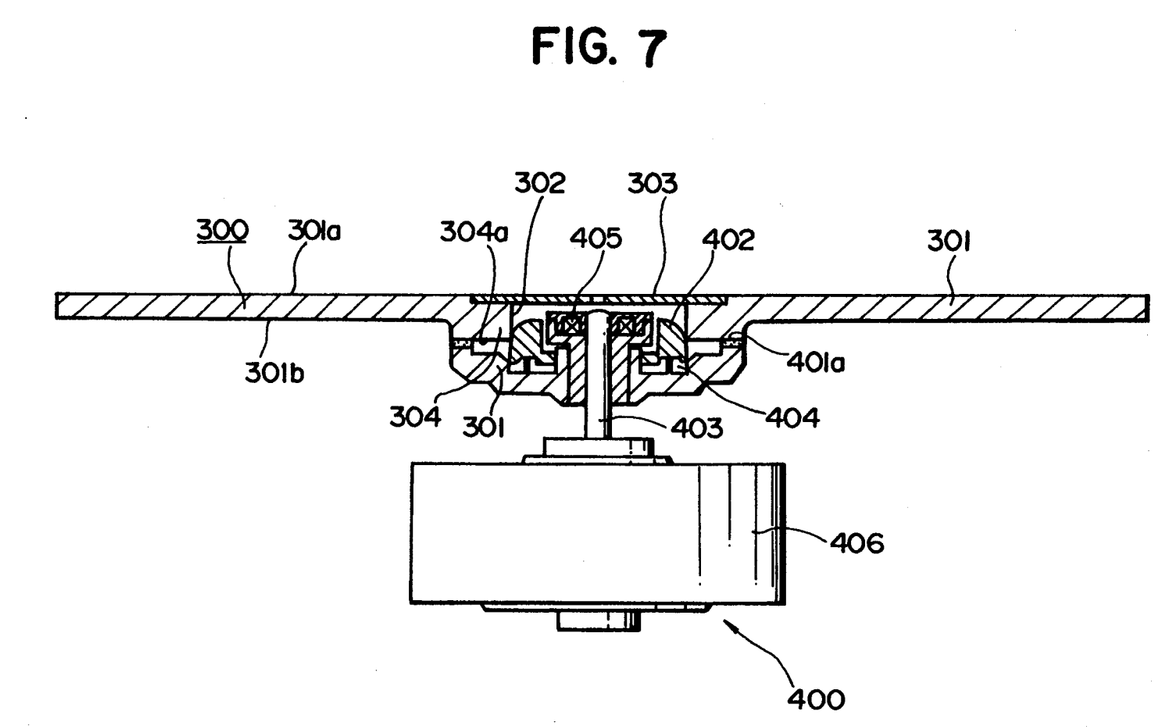
Figure 8:
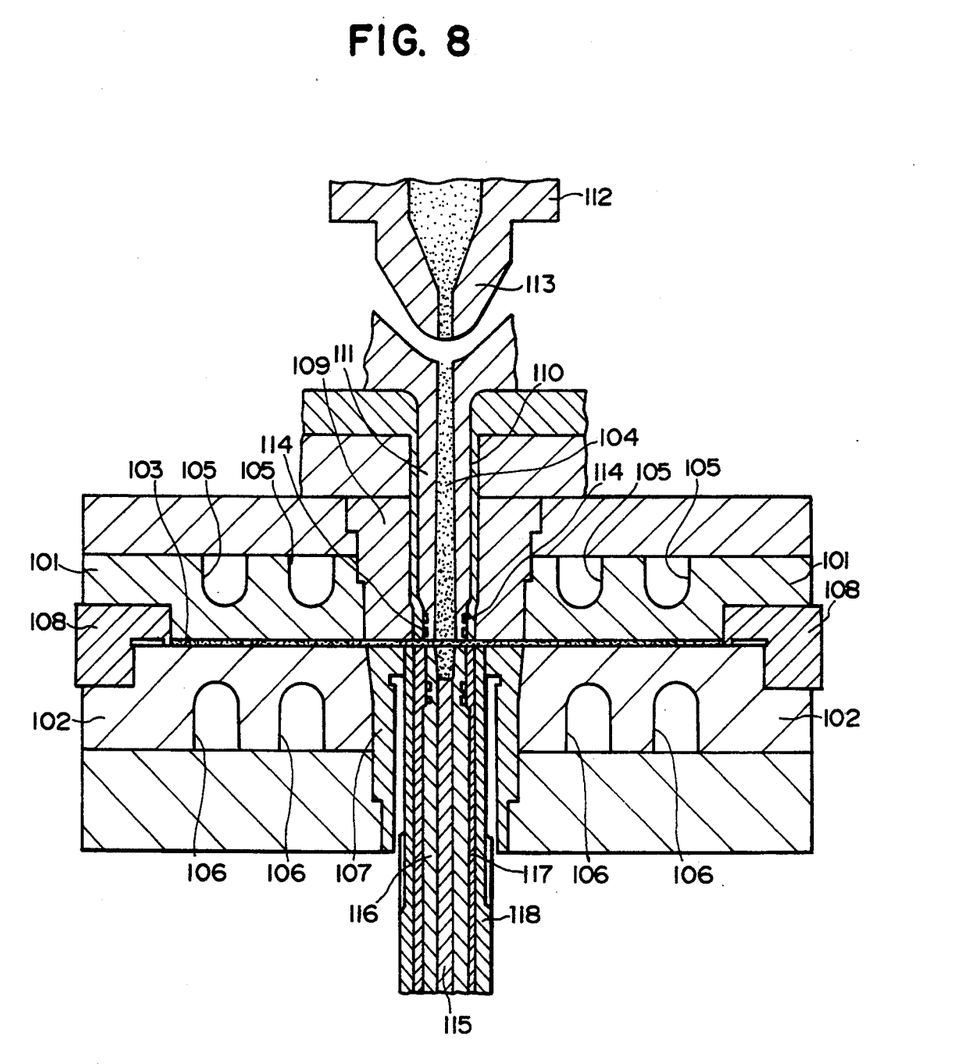

FIG. 6 is a schematic cross-sectional view of a typical conventional metal mold for molding disk substrates. Referring to FIG. 6, what follows is a description of how the representative prior art method of injection molding is illustratively implemented.

In the metal mold shown in FIG. 6, the cavity to be filled with the plastic resin is primarily constituted by a disc-shaped part 103 and a sprue 104, the disc-shaped part 103 being sandwiched by a fixed-side mirror plate 101 and a moving-side mirror plate 102, the sprue 104 being located at the mold center.

The fixed-side mirror plate 101 and the moving-side mirror plate 102 are each provided with temperature controls such as heating medium passages 105 and 106. The heating medium (usually hot water or oil) flowing through the passages controls the temperature of the mirror plates and 102.

The moving-side mirror plate 102 is equipped with a stamper, not shown, for stamping pits and guide grooves onto the signal area of the disc. The stamper is supported by having its pre-punched inner circumference sandwiched by both an inner circumference stamper stop 107 and the moving-side mirror plate 102. The stamper has its outer circumference supported by an outer circumference stamper stop 108.

At the fixed-side mold center is a die 109 engaged with a sprue bush 111 via a sprue bush cap 110. At the center of the sprue bush 111 is the sprue 104 that introduces the molten resin from inside a molding machine cylinder 112 into the disc cavity through a nozzle 113. It is through the sprue 104 that the molten resin goes into the cavity.

Between the sprue bush 111 and the sprue bush cap 110 is a cooling means, not shown, independent of the temperature controls for the mirror plates 101 and 102. This cooling means illustratively comprises grooves provided over the outer circumference of the sprue bush 111, the grooves allowing a cooling medium to flow therethrough. Generally, an O-ring 114 is used to seat the cooling medium.

One reason that this portion needs to be cooled independently of other parts is that the sprue 104, being thicker than the disc-shaped part 103, causes the resin therein to take longer to harden. Another reason is that since the sprue 104, with its thin and long structure, tends to discourage the resin therein from getting extracted therefrom, the sprue temperature is brought lower than that of the mirror plates 101 and 102 so that the resin within the sprue is cooled quickly therein and detached easily therefrom.

At the moving-side mold center is a complex combination of an ejector pin 115, a punch 116, a punch sleeve 117 and an ejector sleeve 118, all surrounding a cold slug well 119. The cold slug well 119 traps the molten resin slug that tends to occur at the nozzle tip when the resin is being filled. For the same reason explained in connection with the sprue 104, the cold slug well 119 is also set for a temperature lower than that of the mirror plates 101 and 102 using a cooling circuit formed between the punch 116 and the punch sleeve 117. This arrangement encourages the thick resin portion to cool and harden quickly.

A disc substrate is formed using the metal molds of the above-described structure as follows: A plastic resin is melted (polycarbonate resin at 280° to 340° C.) in a heated cylinder 112. The molten resin is injected from the tip of the nozzle 113 through the sprue 104 into the metal molds. At this time, the cooled resin slug at the tip of the nozzle 113 is trapped by the cold slug well 119 provided on the moving-side metal mold side. Most of the remaining resin fills up the disc-shaped cavity 103 between the fixed-side mirror plate 101 and the moving-side mirror plate 102, the mirror plates being set for a temperature range of about 100° to 130° C. Simultaneously, the stamper stamps the pits and guide grooves onto the moving-side resin surface. After filling, the punch 116 and punch sleeve 117 of the moving-side metal mold integrally protrude into the fixed-side metal mold side, forming the center hole of the disc and causing the resin within the disc cavity to be sealed by the punch sleeve 117. This keeps the resin pressure unchanged during the cooling period, thus preventing sink marks and poor stamping from occurring.

After cooling, the air (or nitrogen gas, etc.) is bled from between the fixed-side mirror plate 101 and the die 109 so that the disc is detached from the fixed-side metal mold. The entire moving-side metal mold then retracts to open the molds. At this time, the disc and the sprue 104 must be completely detached from the fixed-side metal mold and must stick to the moving-side metal mold. Then the air is bled generally from between the ejector sleeve 118 and the stamper stop 107. When detached from the stamper, the disc is ejected by the ejector sleeve 118. The sprue 104 is pushed out by the ejector pin 115 and is taken out of the molds together with the disc.

Thereafter, the entire moving-side metal mold advances, the molds are closed, and the next cycle of injection molding commences.

As described, conventional metal molds involve a complex structure, especially at the center of the moving-side mold. Because of the need to set the sprue push 111 and punch 116 lower in temperature than the mirror plates 101 and 102, there is a very large temperature distribution particularly in those mold portions that correspond to the inner circumference region of the disc. This kind of temperature distribution significantly affects the forming of the transparent substrate. The smaller the transparent substrate to be formed, the greater the adverse influence of the temperature distribution thereon. Greater double refraction tends to occur in the inner circumference region of the substrate. Illustratively, this tendency worsens the signal quality of the magnetic optical disc. The double refraction of the transparent substrate considerably deteriorates the S/N ratio of the disc formed thereby.

Furthermore, the dimensions of the punch, punch sleeve, ejector sleeve, stamper stop and other related parts have been getting smaller, to the point where it is now becoming almost impossible to sustain necessary mechanical strengths of these parts or to machine them with sufficient precision.

Under these constraints, the prior art optical recording disc is allowed to have a recording area of only up to about 60 mm in inner diameter. There do not exist known optical discs capable of recording signals to an area 50 mm or less in inner diameter.

That is, small-diameter discs so far remain capable of providing a recording area of only limited storage capacity. For example, where the standard CD format (CD-DA format) or the expanded CD-MO format (in which both reproduction and recording are available on magnetic optical discs) is used on an eight-centimeter-diameter disc, the recording or reproduction time is as short as 20 to 22 minutes. If the disc diameter is further reduced, major constraints on the recording area close to the inner circumference make it virtually impossible, even with compressed data, to secure a recording capacity for accommodating audio signals of 60 minutes or longer.

SUMMARY OF THE INVENTION

It is therefore an object of the present invention to overcome the above-described drawbacks and disadvantages and to provide a magnetic optical disc capable of suppressing double refraction on the inner circumference side of the disc so that even when the disc diameter is small, a recording area of sufficient storage capacity will be provided.

In achieving the foregoing and other objects of the present invention and according to one aspect thereof, there is provided a magnetic optical disc with an outer diameter of less than 8.0 cm and made of a transparent substrate containing a magnetic optical recording layer thereon, the recording layer accommodating compressed digital signals of at least 130 megabytes, the transparent substrate having a double refraction retardation of within ±50 nm in an area at least as small as 32 mm in inner diameter, whereby a recording area is formed.

In other words, the magnetic optical disc according to the invention suppresses double refraction in its transparent substrate down to the inner circumference region. In particular, the double refraction retardation is within ±50 nm over an area at least as small as 32 mm in inner diameter on the transparent substrate.

In this manner, a small-diameter disc is given a recording area of sufficient signal storage capacity. The recording area accommodates compressed digital signals of at least 130 megabytes on a disc illustratively with an outer diameter of less than 80 mm. When the track pitch is set for 1.6 μm and the linear velocity for 1.2 to 1.4 m/sec., i.e., the same as with the conventional compact disc, a data compression rate of ¼ allows the above disc to accommodate audio signals of at least 60 minutes.

DESCRIPTION OF THE PREFERRED EMBODIMENT

One preferred embodiment of the present invention will now be described with reference to the accompanying drawings.

Figure 1:
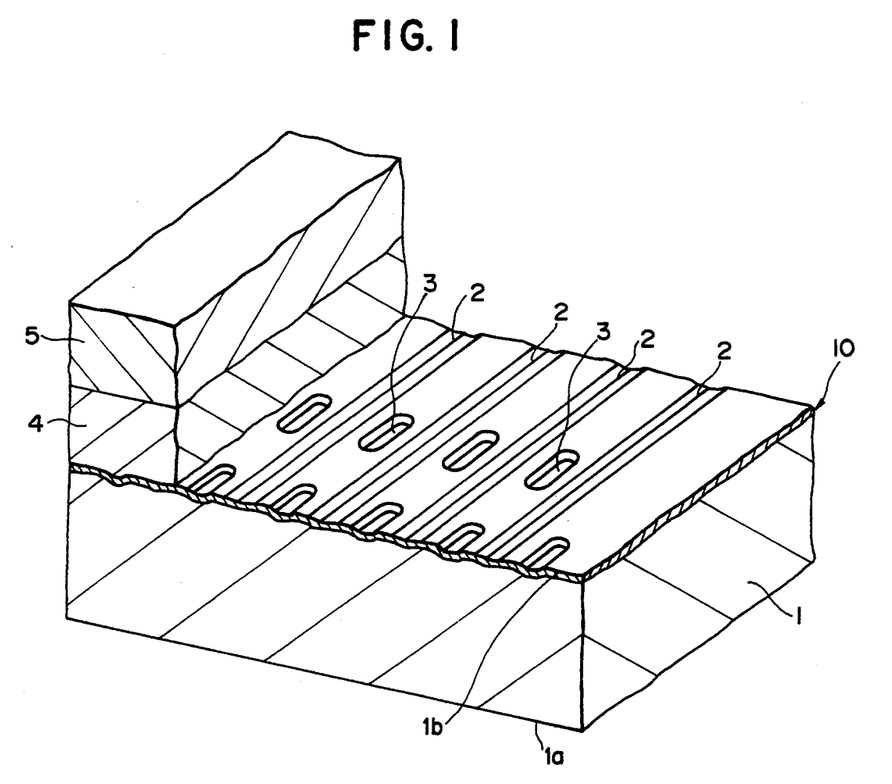
FIG. 1 is a schematic perspective view of a magnetic optical disc embodying the present invention, part of the embodiment being illustrated in a partial cutaway view.

FIG. 1 is a partial cross-sectional view of the magnetic optical disc embodying the present invention. This magnetic optical disc comprises a recording layer 10 and an organic protective film 4 deposited over a transparent substrate 1.

The transparent substrate 1 is a transparent disc-shaped substrate about 1.2 mm thick. This substrate is formed by illustratively subjecting any of such plastic materials as polycarbonate resin, acrylic resin and polyolefine resin to injection molding.

The transparent substrate 1 is required to ensure the provision of a recording area when formed into a small diameter disc. That is, the recording area must be at least as small as 32 mm in inner diameter (i.e., an area 32 mm or more across) with a double refraction retardation of within ±50 nm. This area is arranged so as to accommodate signal recordings of high quality.

Double refraction is a phenomenon that takes place when a light beam transmits through a medium whose refractive index is different within the same plane depending on the direction of the beam (a medium called an anisotropic material). For example, let $n_x$ denote the refractive index of a given direction (e.g., x direction) and $n_y$ represent the refractive index of another direction normal to the x direction (e.g., y direction). In that case, the x component of a transmitted light beam (having a plane of polarization in parallel with the x direction) is out of phase with the y component thereof (having a plane of polarization in parallel with the y direction). This phase difference is called a retardation $\delta$ given as $$\delta = 2\pi/\lambda \cdot (n_x - n_w)d$$

where, $\lambda$ is the wavelength of light, and d is the distance of the medium through which the light transmits.

Preferably, the surface 1a on the laser beam incidence side of the transparent substrate 1 should be substantially smooth in optical terms. The surface 1b on the recording layer (10) side of the substrate 1 is provided as needed with guide grooves 2 and pits 3; the guide grooves 2 have a depth corresponding to about a fourth of the wavelength of the laser beam used, and the pits 3 represent address codes. The pits 3 may not be provided depending on the recording format.

Figure 2:
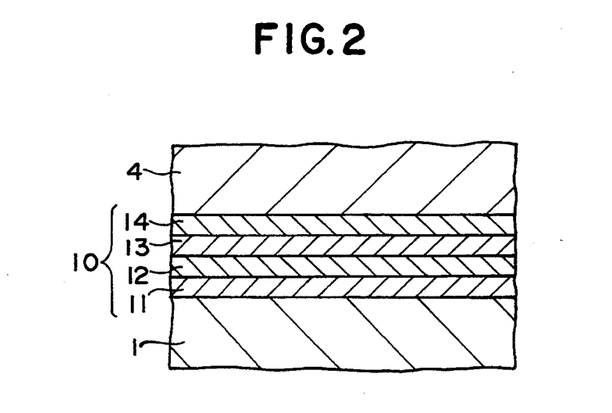
FIG. 2 is a magnified partial cross-sectional view showing part of the recording layer on the embodiment.

The recording layer 10 provided over the recording layer side surface 1b of the transparent substrate 1 may be any of those conventionally used on the magnetic optical recording medium, and the recording layer may be structured as desired. For example, as depicted in FIG. 2, a vacuum film forming machine is suitably used to form successively a first protective dielectric layer 11, a recording magnetic layer 12, a second protective dielectric layer 13 and a reflective metal layer 14, the four layers constituting the recording layer 10.

In the case above, the first and second protective dielectric layers (11 and 13) should preferably be made of a material which, free of oxygen, will prevent oxygen and water molecules from transmitting therethrough and which will allow the laser beam to transmit sufficiently. Suitable materials of which to make the dielectric layers include silicon nitride and aluminum nitride.

The recording magnetic layer 12 is an amorphous ferromagnetic layer with its axis of easy magnetization normal to the film surface. Providing a strong coercive force at room temperature, the recording magnetic layer 12 should preferably have its Curie point at about 200° C. These requirements are met by a Tb-Fe-Co alloy film. For resistance to corrosion, the Tb-Fe-Co alloy film may be supplemented with a trace of a fourth element such as chromium (Cr).

The reflective metal layer 14 deposited on the second protective dielectric layer 13 is a non-magnetic metal layer with a reflectance high enough to reflect 70% or, more of the laser beam. This layer should preferably be thermally conductive. One suitable material of the reflective metal layer 14 is aluminum.

The organic protective film 4 is deposited on the reflective metal layer 14. One suitable material of the layer 4 is any of optically cured resins (i.e., ultraviolet cured resins) which are highly waterproof.

An anti-friction hard protective layer 5 may be optionally formed on the organic protective film 4. In that case, the magnetic head of a recording and reproducing apparatus may come into sliding contact with the surface of the hard protective layer 5.

The magnetic optical disc of the above-described structure suppresses double refraction in the inner circumference region of the transparent substrate 1. The disc is capable of recording about 60 to 74 minutes of stereo audio signals. Illustratively, the disc accommodates at least 130 megabytes of digital signals with a data compression rate of ¼ in the so-called B level stereo mode, the sound quality of the mode being equivalent to that of an FM broadcast (ADPCM with a sampling frequency of 37.8 kHz and a quantization pitch of 4 bits).

The outer diameter of the disc is less than eight centimeters. The diameter restriction is imposed on the disc so that a portable or pocket-size recording and/or reproducing apparatus may be implemented for, use therewith. The disc should preferably have the same track pitch and linear velocity as the conventional compact disc, i.e., 1.6 µm in track pitch and 1.2 to 1.4 m/sec. in linear, velocity.

Illustratively, the magnetic optical disc according to the invention may measure 64 mm in outer disc diameter, 61 mm in outer diameter of its data recording area, 32 mm in inner diameter of its data recording area, 30 mm in inner diameter of its lead-in area, and 9 to 11 mm (e.g., 10 mm) in center hole diameter. The disc may be housed in a 70 mm × 74 mm disc caddy when marketed. Given such a small disc, a pocket-size recording and reproducing apparatus may be developed for use therewith.

Where data is to be recorded and/or reproduced for up to about 72 to 76 minutes in the above-mentioned one-fourth data compression mode, the disc may have its data recording area measure as desired between two extremes: 32 mm in inner diameter and 60 to 62 mm in outer diameter on the one hand, and 50 mm in inner diameter and 71 to 73 mm in outer diameter on the other.

During manufacture of the above magnetic optical disc, one of the requirements to be met is how to suppress double refraction within the inner circumference region of the transparent substrate. This requirement is met through the use of a novel metal mold structure and substrate molding method according to the invention, whereby double refraction is suppressed down to the inner circumference region.

Figure 3:
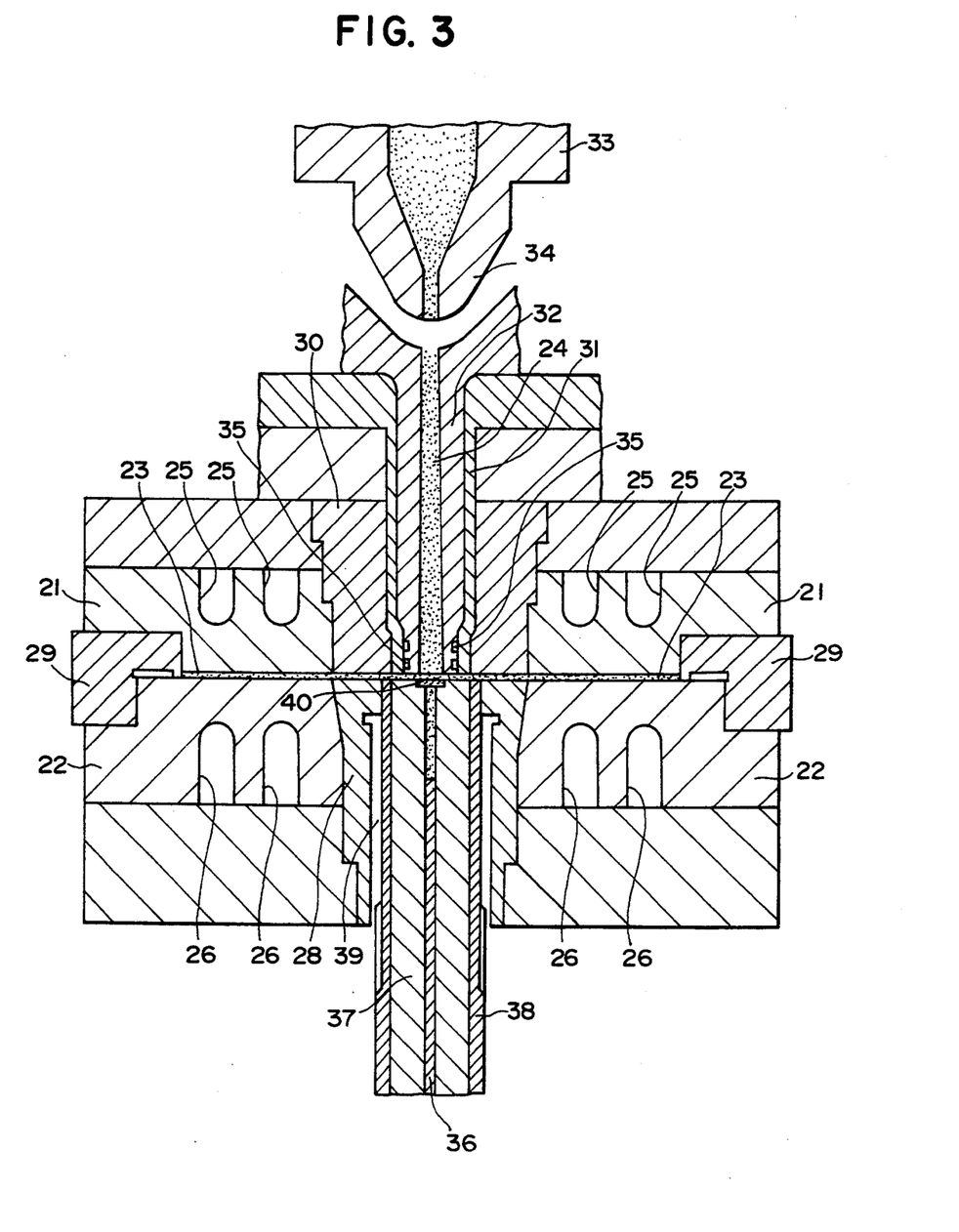
FIG. 3 is a schematic cross-sectional view of representative metal molds for suppressing double refraction in the inner circumference region of the disc embodying the invention.

FIG. 3 illustrates representative metal molds for suppressing double refraction in the inner circumference region of the disc embodying the invention.

In the metal molds of FIG. 3, the cavity to be filled with the resin is principally constituted by a disc-shaped part 23 and a sprue 24, the disc-shaped part being sandwiched by a fixed-side mirror plate 21 and a moving-side mirror plate 22, the sprue 24 being located at the mold center.

The fixed-side mirror plate 21 and the moving-side mirror plate 22 are each provided with temperature controls such as heating medium passages 25 and 26. The heating medium (usually hot water or oil) flowing through the passages controls the temperature of the mirror plates 21 and 22.

Figure 4:
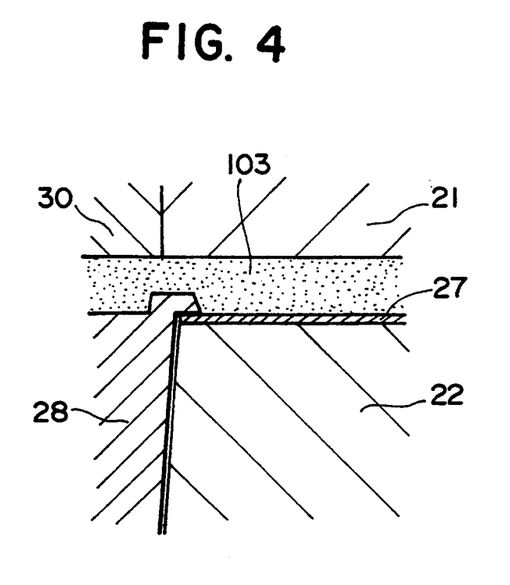
FIG. 4 is a magnified partial cross-sectional view of the stamper stop and its surroundings in connection with the embodiment.

The moving-side mirror plate 22 is equipped with a stamper 27 for stamping pits and guide grooves onto the signal area of the disc. As shown in FIG. 4, the stamper 27 is supported by having its prepunched inner circumference sandwiched by both an inner circumference stamper stop 28 and the moving-side mirror plate 22. The stamper 27 has its outer circumference supported by an outer circumference stamper stop 29.

The structure of the fixed-side metal mold is the same as that of its conventional counterpart shown in FIG. 6. That is, at the fixed-side mold center is a die 30 engaged with a sprue bush 32 via a sprue bush cap 31. At the center of the sprue bush 32 is the sprue 24 that introduces the molten resin from inside a molding machine cylinder 33 into the disc cavity through a nozzle 34. It is through the sprue 24 that the molten resin goes into the cavity.

Between the sprue bush 32 and the sprue bush cap 31 is a cooling means, not shown, independent of the temperature controls for the mirror plates 21 and 22. This cooling means illustratively comprises grooves provided over the outer circumference of the sprue bush 32, the grooves allowing a cooling medium to flow therethrough. Generally, an O-ring 35 is used to seal the cooling medium.

The structure of the moving-side metal mold is simpler than that of its conventional counterpart. In particular, only an ejector pin 36, a punch 37 and an ejector sleeve 38 are provided at the center of the moving-side metal mold, the three parts surrounding a cold slug well 39. The cold slug well 39 has an elongated structure as thin as 1 to 2 mm across. The small heat storage capacity of the cold slug well 39 allows the molten resin slug trapped therein to cool easily. That is, the slug is quickly hardened without the need to cool the punch 37 independently of the moving-side mirror plate 22. Thus, unlike its conventional counterpart, the punch 37 has no cooling circuit.

The arrangement above causes the temperature distribution within the metal molds to be more uniform than ever, suppressing the increase of double refraction in the inner circumference region. Because the punch 37 is not cooled independently, there is no need for a complex dual structure comprising a cooling circuit for the punch and punch sleeve. The reduced structural complexity is more conducive to forming discs of smaller diameters with the undiminished mechanical strength. Furthermore, the root of the cold slug well 39 is a little overhung, i.e., thicker than other portions so that when the molds are opened, the content inside will be detached quickly from the sprue side.

The processes in which a disc substrate is formed using the metal molds of the above-described structure are substantially the same as those of conventional injection molding. First, a plastic resin is melted (polycarbonate resin at 280° to 340° C.) in a heated cylinder 33. The molten resin is injected from the tip of the nozzle 34 through the sprue 24 into the metal molds. At this time, the cooled resin slug at the tip of the nozzle 34 is trapped by the cold slug well 39 provided on the moving-side metal mold side. Because the cold slug well 39 is thin and long and thus possesses the low heat storage capacity, the slug is quickly hardened without a cooling circuit.

Most of the remaining resin fills up the disc-shaped cavity 23 between the fixed-side mirror plate 21 and the moving-side mirror plate 22, the mirror plates being set for a temperature range of about 100° to 130° C. Simultaneously, the stamper stamps the pits and guide grooves onto the moving-side resin surface. After filling the punch 37 of the moving-side metal mold protrudes into the fixed-side metal mold side, forming the center hole of the disc and sealing the resin within the disc cavity. This keeps the resin pressure unchanged during the cooling period, thus preventing sink marks and poor stamping from occurring.

After cooling, the air (or nitrogen gas, etc.) is bled from between the fixed-side mirror plate 21 and the die 30 so that the disc is detached from the fixed-side metal mold. The entire moving-side metal mold then retracts to open the molds. At this time, the disc and the sprue must be completely detached from the fixed-side metal mold and must stick to the moving-side metal mold. Then the air is bled generally from between the ejector sleeve 38 and the stamper, stop 28. When detached from the stamper, the disc is ejected by the ejector sleeve 38. The sprue is pushed out by the ejector pin 36 and is taken out of the molds together with the disc.

Thereafter, the entire moving-side metal mold advances, the molds are closed, and the next cycle of injection molding commences.

Figure 5:
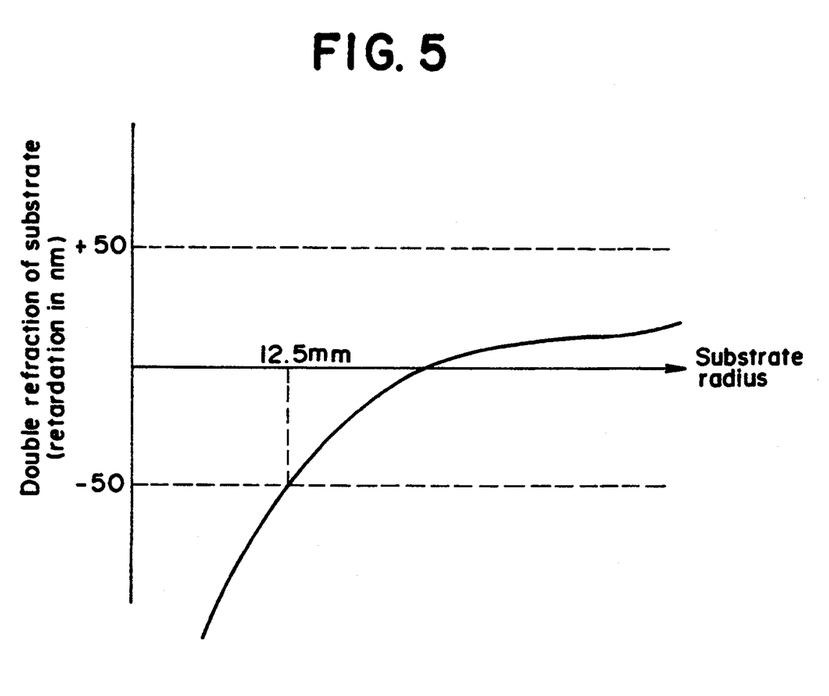
FIG. 5 is a view illustrating the radius versus double refraction characteristic of a polycarbonate substrate formed by the metal molds of FIG. 3.

FIG. 5 illustrates the magnitude of the double refraction retardation at varying radial distances on a transparent substrate (polycarbonate substrate) formed by the molding method described above.

The metal molds of the above-described structure form the polycarbonate resin into a disc measuring 10 mm in center hole diameter, 64 mm in outer disc diameter, and as small as 30 mm in inner diameter of its recording area. As is evident from FIG. 5, the double refraction on the innermost track of the recording area (i.e., 30 mm across) of this disc fell within the tolerance of ±50 nm when measured.

Although a specific method has been described above whereby the double refraction is suppressed in the inner circumference region of the disc, this method is not limitative of the present invention. Any other alternative method may be utilized to manufacture the disc as long as the double refraction is thereby suppressed in the inner circumference region of the substrate.

As described and according to the invention, the double refraction retardation of an area at least as small as 32 mm in inner diameter on the transparent substrate remains within ±50 nm. This allows a small-diameter magnetic optical disc to provide a recording area of sufficient storage capacity. In combination with a novel magnetic optical recording system, the disc may illustratively accommodate at least 60 minutes of the user's audio signals and the like while measuring smaller than any other conventional discs of comparable storage capacity.

While a preferred embodiment of the invention has been described using specific terms, such description is for illustrative purposes only, and it is to be understood that changes and variations may be made without departing from the spirit or scope of the appended claims.

What is claimed is:

1. A magnetic optical disc comprising:
  a transparent substrate;
  a magnetic optical recording layer formed on said substrate;
  said disc measuring less than 80 millimeters in diameter and having at least 130 megabytes of compressed digital signals recorded thereon;
  said disc containing a recording area on said magnetic optical recording layer at least as small as 32 mm at its inner diameter, and a double refraction retardation of said recording area being within ±50 nm.

2. A magnetic optical disc according to claim 1, wherein said 130 megabytes digital signals have a data compression rate of one fourth.

3. A magnetic optical disc according to claim 1, wherein said double refraction retardation is defined by the equation $$\delta = 2\pi/\lambda \cdot (n_x - n_y)d$$

where, $\delta$ = double refraction retardation
$\lambda$ = wavelength of the light used
d = distance of the medium through which the light transmits
$n_x$ = refractive index in x direction
$n_y$ = refractive index of y direction (normal to x direction).

4. The magnetic optical disc according to claim 1, wherein said magnetic optical recording layer comprises a first dielectric layer on said substrate, a magnetic recording layer on said first dielectric layer, a second dielectric layer on said magnetic recording layer, and including a layer adapted to reflect a light beam.

5. The magnetic optical disc according the claim 4, wherein said magnetic recording layer comprises plural superimposed layers formed of a Tb Fe Co alloy.

6. The magnetic optical disc according to claim 1, wherein said signals are recorded on plural generally circular tracks on said recording layer, said tracks having a track pitch of about 1.6 μm, and said signals recorded on said disc being adapted to be read therefrom by optical means when said disc is rotated with a tangential speed of 1.2-1.4 meters per second.

* * * * *